US008149457B2

United States Patent
Suzuki et al.

(10) Patent No.: US 8,149,457 B2
(45) Date of Patent: Apr. 3, 2012

(54) IMAGE FORMING APPARATUS, IMAGE FORMING METHOD, AND COMPUTER READABLE MEDIUM RECORDING A PRINTING DATA GENERATION PROGRAM

(75) Inventors: Chikara Suzuki, Shiojiri (JP); Tomohiro Nakamura, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 832 days.

(21) Appl. No.: 12/251,772

(22) Filed: Oct. 15, 2008

(65) Prior Publication Data
US 2009/0103120 A1    Apr. 23, 2009

(30) Foreign Application Priority Data

Oct. 23, 2007 (JP) ................................. 2007-275768
Jul. 14, 2008 (JP) ................................. 2008-182949

(51) Int. Cl.
*H04N 1/04* (2006.01)
(52) U.S. Cl. .......... 358/1.9; 358/529; 358/502; 358/501
(58) Field of Classification Search ................... 358/1.9, 358/529, 502, 501, 518
See application file for complete search history.

(56) References Cited

U.S. PATENT DOCUMENTS

| 5,848,225 | A  | * | 12/1998 | Nickell et al. ................. 358/1.9 |
| 6,259,536 | B1 | * | 7/2001  | Coleman ........................ 358/1.9 |
| 7,362,467 | B1 | * | 4/2008  | Tsukimura ..................... 358/1.9 |
| 7,952,752 | B2 | * | 5/2011  | Shoji ............................. 358/1.9 |

FOREIGN PATENT DOCUMENTS

| JP | 2000-232590 A | 8/2000 |
| JP | 2002-165104 A | 6/2002 |

* cited by examiner

*Primary Examiner* — Houshang Safaipour
(74) *Attorney, Agent, or Firm* — DLA Piper LLP (US)

(57) ABSTRACT

An image forming apparatus using a plurality of colorants for image formation, includes a generation unit which generates bitmap data, in which each pixel has a gradation value of each color of the colorants, with respect to an object of the image formation; a classification unit which classifies the pixels into a plurality of predetermined groups based on the bitmap data and generates classification data corresponding to the classified groups for each pixel; a detection unit which detects, based on the classification data, a range, in which a correction processing of modifying the gradation values has to be executed, on the bitmap data; and a correction unit which executes the correction processing to the detected range, wherein the image formation is executed based on bitmap data after the correction processing.

8 Claims, 11 Drawing Sheets

FIG. 10

| MONOCHROMATIC K | C | M | Y | K |
|---|---|---|---|---|
| ⋮ | ⋮ | ⋮ | ⋮ | ⋮ |
| 203 | 128 | 114 | 96 | 139 |
| ⋮ | ⋮ | ⋮ | ⋮ | ⋮ |
| 235 | 102 | 92 | 83 | 192 |
| ⋮ | ⋮ | ⋮ | ⋮ | ⋮ |

IMAGE FORMING APPARATUS, IMAGE FORMING METHOD, AND COMPUTER READABLE MEDIUM RECORDING A PRINTING DATA GENERATION PROGRAM

CROSS-REFERENCE TO RELATED APPLICATIONS

This application is based upon and claims the benefit of priority from the prior Japanese Patent Application No. 2007-275768, filed on Oct. 23, 2007 and the prior Japanese Patent Application No. 2008-182949, filed on Jul. 14, 2008, the entire contents of which are incorporated herein by reference.

BACKGROUND OF THE INVENTION

1. Field of the Invention

The present invention relates to an image forming apparatus or the like that performs a processing of supplying a colorant for each color, and more particularly to an image forming apparatus or the like that can reliably and rapidly perform a correction processing with respect to the so-called registration shift occurring due to the processing of supplying the colorants.

2. Description of the Related Art

In an image forming apparatus such as a laser printer, a processing of supplying colorants of different colors and causing the adhesion of the colorants to paper, an intermediate medium, or a photosensitive body is performed independently for each color. A problem that is sometimes encountered is that the formed images of different colors are shifted with respect to each other due to insufficient mechanical accuracy of the apparatus. When such registration shift (also called "color shift") occurs, it adversely affects the output quality, for example, producing white portions (drop-out white) that have not been initially present on the boundaries of characters and background. For this reason, a processing of correcting the image data of the output image in advance is typically performed to prevent the defects caused by such registration shift.

Japanese Patent No. 3852234 suggests an apparatus in the related technical field that prevents effectively the so-called edge light coloring and performs rapid processing.

Japanese Patent Application Laid-open No. 2002-165104 describes an apparatus that performs a trapping processing such that an object seems to be of the same order as an actual one even when the plate shift occurs.

However, in the apparatus described in Japanese Patent No. 3852234, because a region where image data are corrected is determined in object units of the image, when an object that has to be corrected originally, such as text or graphics, is included by an object such as an image that does not corrected at an application stage from which image data are supplied, the correction is not performed with respect to these objects and reliable correction processing is not performed. Further, image data received by an image forming apparatus such as a printer are represented in PDL of various formats and the classification of objects is established for each format. Therefore, in the aforementioned processing in object units, a respective processing procedure has to be prepared for each format and the processing becomes complex and inefficient.

On the other hand, in a most general usage mode of image forming apparatuses, such as business use, drop-out white caused by the registration shift that occurs between the black text or graphic and a color background becomes a serious problem, and no method resolving this problem has been suggested.

Therefore, an efficient method for resolving this problem encountered in business use is needed in processing in pixel units that is considered to be a time-consuming processing.

SUMMARY OF THE INVENTION

Accordingly, it is an object of the present invention to provide an image forming apparatus that performs a processing of supplying a colorant for each color and that can reliably and rapidly perform a correction processing with respect to the so-called registration shift occurring due to the processing of supplying the colorants.

In order to attain this object, one gist of the present invention resides in an image forming apparatus using a plurality of colorants for image formation, including a generation unit which generates bitmap data, in which each pixel has a gradation value of each color of the colorants, with respect to an object of the image formation; a classification unit which classifies the pixels into a plurality of predetermined groups based on the bitmap data and generates classification data corresponding to the classified groups for each pixel; a detection unit which detects, based on the classification data, a range, in which a correction processing of modifying the gradation values has to be executed, on the bitmap; and a correction unit which executes the correction processing to the detected range, wherein the image formation is executed based on bitmap data after the correction processing.

Further, according to the preferred aspect of the above-described invention, the plurality of groups include at least a group of dark gray for which the gradation value of black color is equal to or higher than a predetermined value and gradation values of colors other than black are 0, and a group of colors for which the gradation values of a color other than black is not 0 and the gradation value of black color is 0.

Further, according to the preferred aspect of the above-described invention, the plurality of groups include a group of white for which the gradation values of all colors are 0.

Further, according to the preferred aspect of the above-described invention, a region of the dark gray, for which the gradation values are the same, and which is adjacent to a region of the color in an image formation object is detected as a range in which the correction processing has to be executed.

Further, according to the preferred aspect of the above-described invention, the detection of the range in which the correction processing has to be executed is performed by checking, with respect to each pixel classified into the groups of color, whether the region of the dark gray for which the gradation values are the same continues in all directions around the pixels, based on the classification data.

Further, according to the preferred aspect of the above-described invention, a region in which black color and a color other than black are mixed and a region in which the gradation value of black color varies in the image formation object are not detected as ranges in which the correction processing has to be executed.

In order to attain the above-described object, another gist of the present invention resides in an image forming method in an image forming apparatus using a plurality of colorants for image formation, the method including: generating bitmap data, in which each pixel has a gradation value of each color of the colorants, with respect to an object of the image formation; classifying the pixels into a plurality of predetermined groups based on the bitmap data and generating classification data corresponding to the classified groups for each pixel; detecting, based on the classification data, a range, in which a correction processing of modifying the gradation values has to be executed, on the bitmap; and executing the correction processing to the detected range, wherein the image formation is executed based on bitmap data after the correction processing.

In order to attain the above-described object, one gist of the present invention resides in a computer readable medium recording a printing data generation program that causes a host device of an image forming apparatus to execute a processing of generating printing data for an image forming apparatus using a plurality of colorants for image formation, the program causing the host device to execute: generating bitmap data in which each pixel has a gradation value of each color of the colorants with respect to an object of the image formation; classifying the pixels into a plurality of predetermined groups based on the bitmap data and generating classified data corresponding to the classification groups for each pixel; detecting, based on the classification data, a range, in which a correction processing of modifying the gradation values has to be executed, on the bitmap; and executing the correction processing to the detected range, wherein the image formation is executed based on bitmap data after the correction processing.

Other objects and features of the present invention will become apparent from the below-described embodiments of the invention.

BRIEF DESCRIPTION OF THE DRAWINGS

FIG. 10 shows an example of the correspondence table of composite K;

DESCRIPTION OF THE PREFERRED EMBODIMENTS

Figure 1:
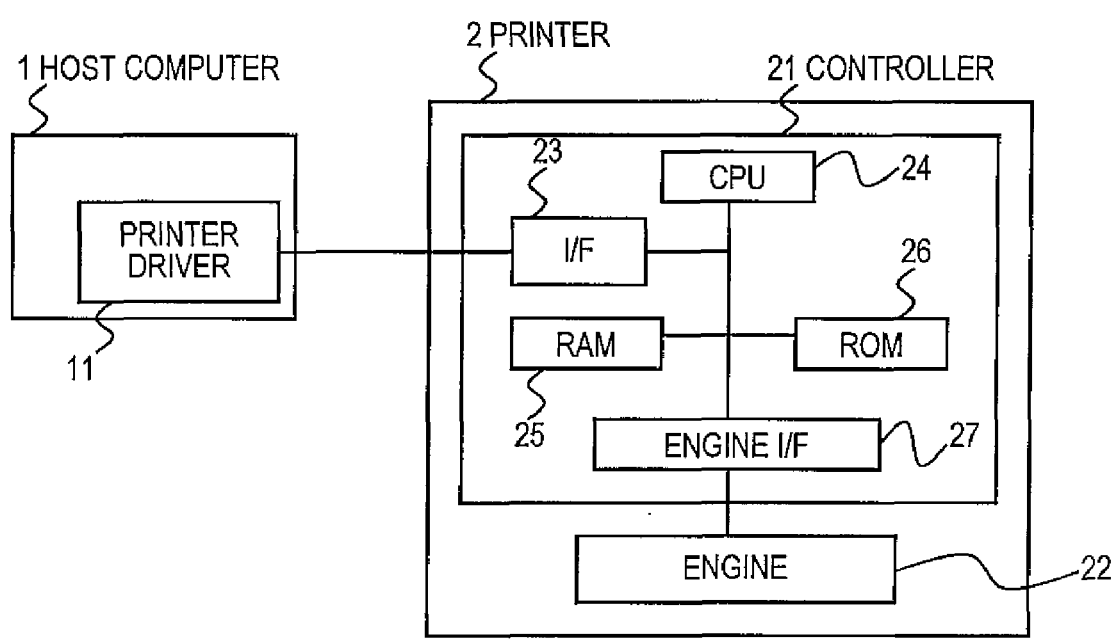
FIG. 1 is a configuration diagram relating to an embodiment of a printer that is an image forming apparatus employing the present invention.

An embodiment of the present invention will be described below with reference to the appended drawings. However, these embodiments place no limitation on the technical scope of the present invention. In the figures, identical or similar components will be assigned with identical reference numerals or reference symbols.

FIG. 1 is a configuration diagram relating to an embodiment of a printer that is an image forming apparatus employing the present invention. A printer 2 shown in FIG. 1 is a printer employing the present invention. This printer performs labeling with respect to each pixel in a bitmap of a printing object image, detects an object range of correction processing in relation to a registration shift and executes the correction based on the label assigned to each pixel, and reliably and efficiently performs the processing against the registration shift.

A host computer 1 shown in FIG. 1 is a host device that sends a printing request to the printer 2, and composed of a personal computer and so on. The host computer 1 includes a printer driver 11, and when a printing request is issued, the printer driver 11 generates printing date including image data and a control command and sends them to the printer 2 in response to the user's operations and so on. In this case, the data sent by the printer driver 11 to the printer 2 are represented with PDL. Further, the printer driver 11 can be also composed of a program designed to execute the aforementioned processing and a control device (not shown in the figure) of the host computer 1 that executes the processing according to the program. The program for the printer driver 11 can be installed in the host computer 1 by downloading from a predetermined site via a network such as internet or from a storage medium such as a CD.

The printer 2 is the so-called laser printer composed of a controller 21 and an engine 22, as shown in FIG. 1.

The controller 21 receives a printing request from the host computer 1 and performs a processing of outputting a printing instruction to the engine 22 and so on. As shown in FIG. 1, the controller 21 includes an I/F 23, a CPU 24, a RAM 25, a ROM 26, and an engine I/F 27.

The I/F 23 is a unit that receives the printing data sent from the host computer 1.

The CPU 24 is a unit that controls various kinds of processing performed by the controller 21, and when a printing request is received from the host computer 1, the CPU performs a processing of generating bitmap data (plane data of each color) for outputting to the engine 22 by implementing a predetermined image processing with respect to the image data contained in the received printing data and a processing of interpreting a control command contained in the printing data and instructing an adequate printing processing to the engine 22. Further, the CPU 24 also executes a correction processing as a measure against registration shift in relation to the processing of generating the bitmap data. Characteristics of the printer 2 of the present invention lie in the correction processing. Details of this are to be described later. The processing executed by the CPU 24 is performed mainly according to the program stored in the ROM 26.

The RAM 25 is a memory that stores the received printing data and image data after each processing, and this memory stores the above-described bitmap data (plane data) of each color and classification data (classification planes) generated with respect to the bitmap data. These bitmap data and classification data will be described below in greater details.

The ROM 26 is a memory that stores a program of each processing executed by the CPU 24.

The engine I/F 27 is a unit that serves as an interface between the controller 21 and the engine 22, this interface reads the image data (bitmap data after the aforementioned correction processing) stored in the aforementioned RAM 25 at a predetermined timing when the printing is executed by the engine 22 and transfers these image data to the engine 22 after the data have been subjected to a predetermined processing. The engine I/F 27 includes a memory that temporarily stores the data, a decompression unit, and a screen processing unit (none is shown in the figure) and performs the decompression of compressed data and a screen processing of converting the decompressed data into dot data with respect to the image data read out from the RAM 25. More specifically, the engine I/F 27 is composed of ASIC.

The engine 22 includes a mechanism controller and a printing mechanism (none is shown in the figure). The printing mechanism includes a photosensitive drum, a charging unit, an exposure unit, a development device, and a transfer unit (none is shown in the figure) and so on. When printing is executed, the photosensitive drum is electrically charged by the charging unit, the charged photosensitive drum is irradiated with a beam of a light source such as a laser or a LED array contained in the exposure unit, and a latent image is formed by electrostatic charges. Then, the latent image is developed into an image by a developer with the development device including a toner cartridge that accommodates the developer (toner), and the developed toner image is transferred by the transfer unit onto a printing medium such as paper, where the image is fixed by a fixing unit. The printing medium is thereafter discharged to the outside of the printer 2. In the printer 2, colorants of CMYK colors are used as the developers, and the supply of the colorants is performed independently for each color in at least one processing from among a supply of the colorants to the photosensitive body, a supply of the colorants to an intermediate transfer medium, and a supply of the colorants to the printing medium. Therefore, in the printer 2, the image position on the printing medium might shift depending on color.

In the printer 2 of the above-described configuration, where a printing request is received from the host computer 1, the printing data are interpreted and bitmap data having a gradation value of each color for each pixel are generated from the image data in the PDL format. The bitmap data are composed of plane data of each CMYK color of the colorants with respect to one sheet of printing medium and stored in an image buffer of the RAM 25. Then, a correction processing as a measure against registration shift is performed with respect to the bitmap, the bitmap data subjected to the correction processing are read out from the engine I/F 27, and after the above-described processing, the printing processing is executed with the engine 22.

As described hereinabove, a specific feature of the printer 2 is the correction processing as a measure against a registration shift. The specific contents of this processing will be explained below.

Figure 2:
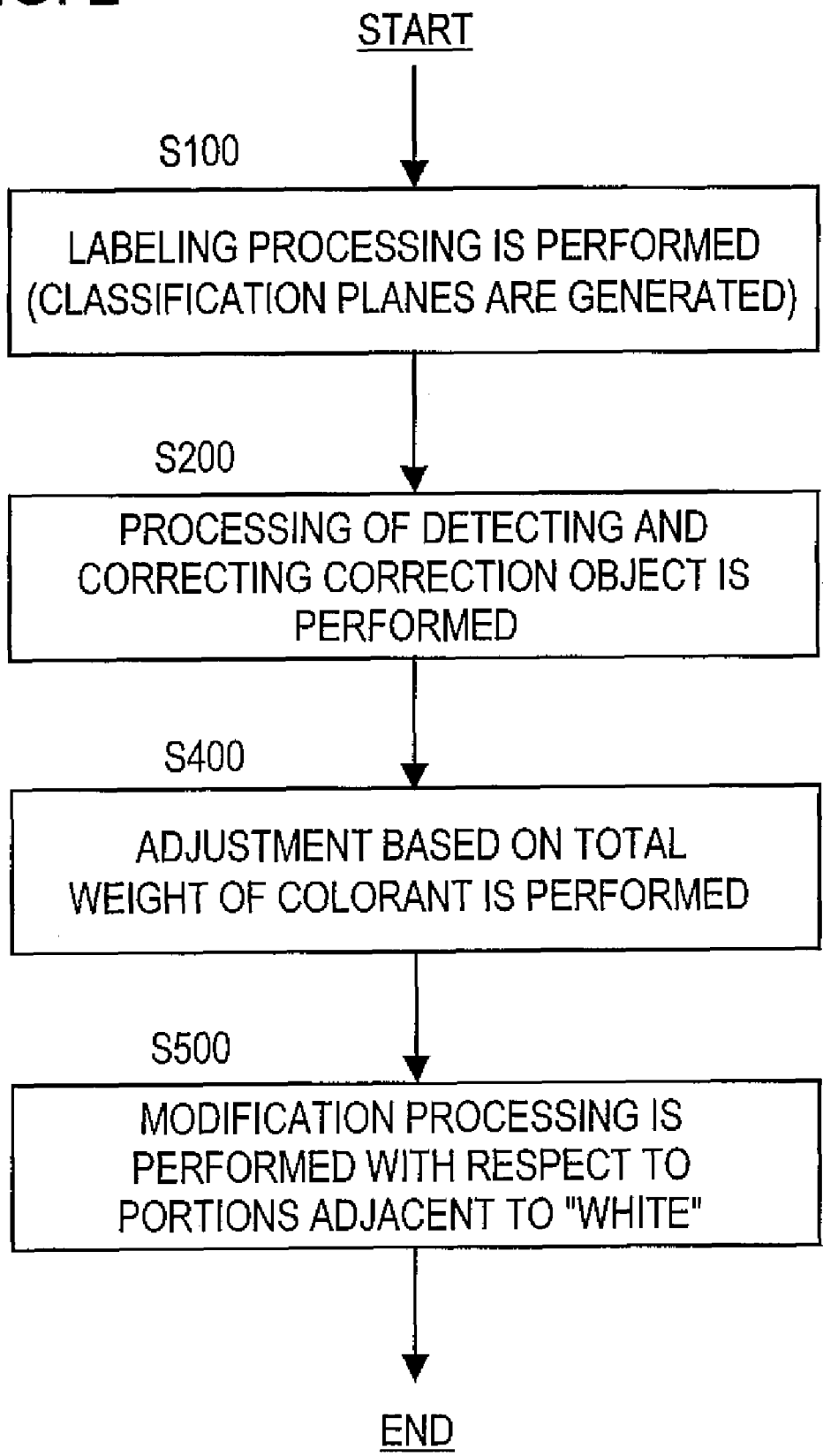
FIG. 2 is a flowchart illustrating the entire procedure of the correction processing performed by the CPU 24.

FIG. 2 is a flowchart illustrating the entire procedure of the correction processing performed by CPU 24. As described hereinabove, when a printing request is received, and the generation of bitmap data is completed by the CPU 24, the correction processing is started and, first, a labeling processing is performed (step S100). More specifically, the pixels are classified into predetermined groups based on the generated bitmap data, and a label corresponding to a classified group is attached to each pixel. More specifically, the aforementioned classification data (classification planes) are generated.

Figure 3A:
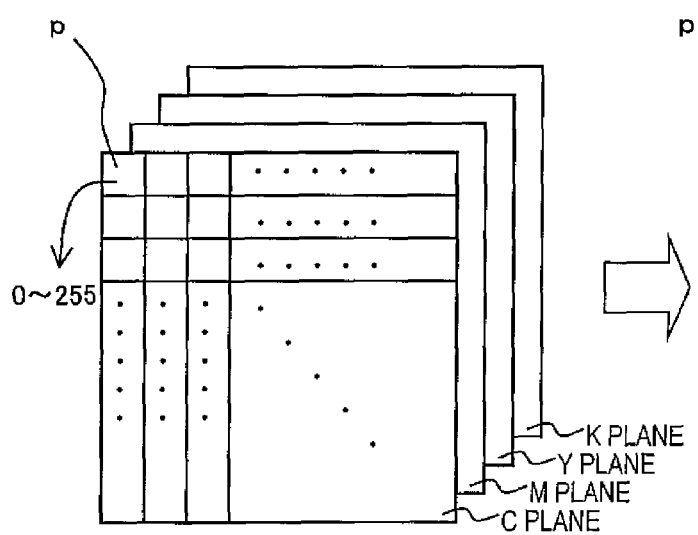
FIG. 3A and FIG. 3B show an example of bitmap data and classification data.
Figure 3B:
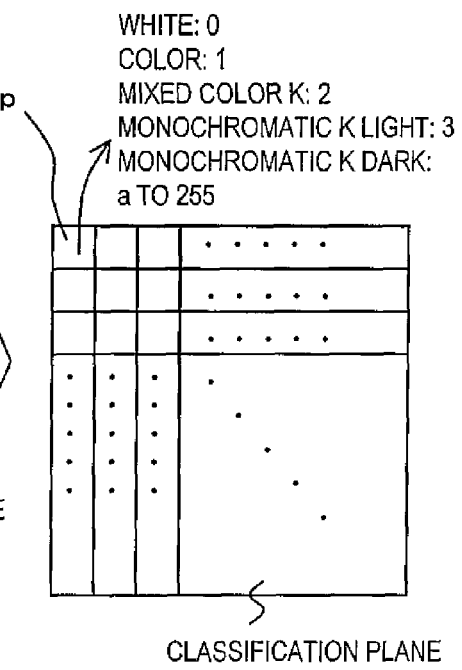

FIG. 3A and FIG. 3B show an example of bitmap data and classification data. FIG. 3A shows an example of the generated bitmap data. As described above, the bitmap data are composed of a C plane, an M plane, a Y plane, and a K plane. Each pixel (p in the figure) of each plane has a gradation value of each color. Here each color will be assumed to be represented by 256 gradations from 0 to 255, and each pixel has any value of from 0 to 255.

FIG. 3B shows an example of classification data generated from the bitmap data shown in FIG. 3A. Each pixel (p in the figure) herein has the aforementioned label. In the printer 2, the predetermined groups are of 5 kinds: "White", "Color", "Mixed Color K", "Monochromatic K light", and "Monochromatic K Dark". A pixel for which all the values of CMYK of the bitmap data are zero is classified into the "White" group. A pixel for which any of the CMY values of the bitmap data is not zero, but the K value is zero is classified into the "Color" group. A pixel for which any of the CMY values of the bitmap data is not zero and the K value is not zero is classified into the "Mixed Color K" group. A pixel for which all the values of CMY of the bitmap data are zero and the K value is less than a predetermined value (a) that has been set in advance (for example, $4 \leqq a \leqq 255$) is classified into the "Monochromatic K Light" group. A pixel for which all the values of CMY of the bitmap data are zero and the K value is equal to or higher than the predetermined value (a) is classified into the "Monochromatic K Dark" group.

Therefore, the CPU 24 first classifies the pixels from the values of each plane of the bitmap data according to the above-described rule, and takes the labels of the classified groups as the values of classification planes. Then, for example, the label is taken as 0 for the pixels classified into the "White" group, the label is taken as 1 for the pixels classified into the "Color" group, the label is taken as 2 for the pixels classified into the "Mixed Color K" group, the label is taken as 3 for the pixels classified into the "Monochromatic K Light" group, and the label is taken as the gradation value (a to 255) of K (plane) for the pixels classified into the "Monochromatic K Dark" group.

Where the processing of labeling is thus completed, the CPU 24 performs a processing of detecting a correction object region of bitmap data that are taken as an object by using the classification data (planes) and executing an appropriate correction with respect to this region (step S200). The specific contents of this processing will be described below.

Then, the CPU 24 executes the adjustment processing based on the total amount of colorants with respect to the bitmap data after the above-described correction (step S400), and then executes a modification processing with respect to portions adjacent to the pixels classified into the "White" group (step S500). The adjustment processing is performed so that the gradation value of each pixel after the above-described correction becomes equal to or less than the predetermined value. Such a processing is performed because defects are induced if the total amount of the colorant that adheres to the printing medium is equal to or higher than a predetermined value. Further, the modification processing is performed to modify the bitmap data after correction in order to cancel the adverse effect produced by the correction performed against the registration shift in portions adjacent to a white region. The specific contents of these processing operations will be described below.

Figure 4:
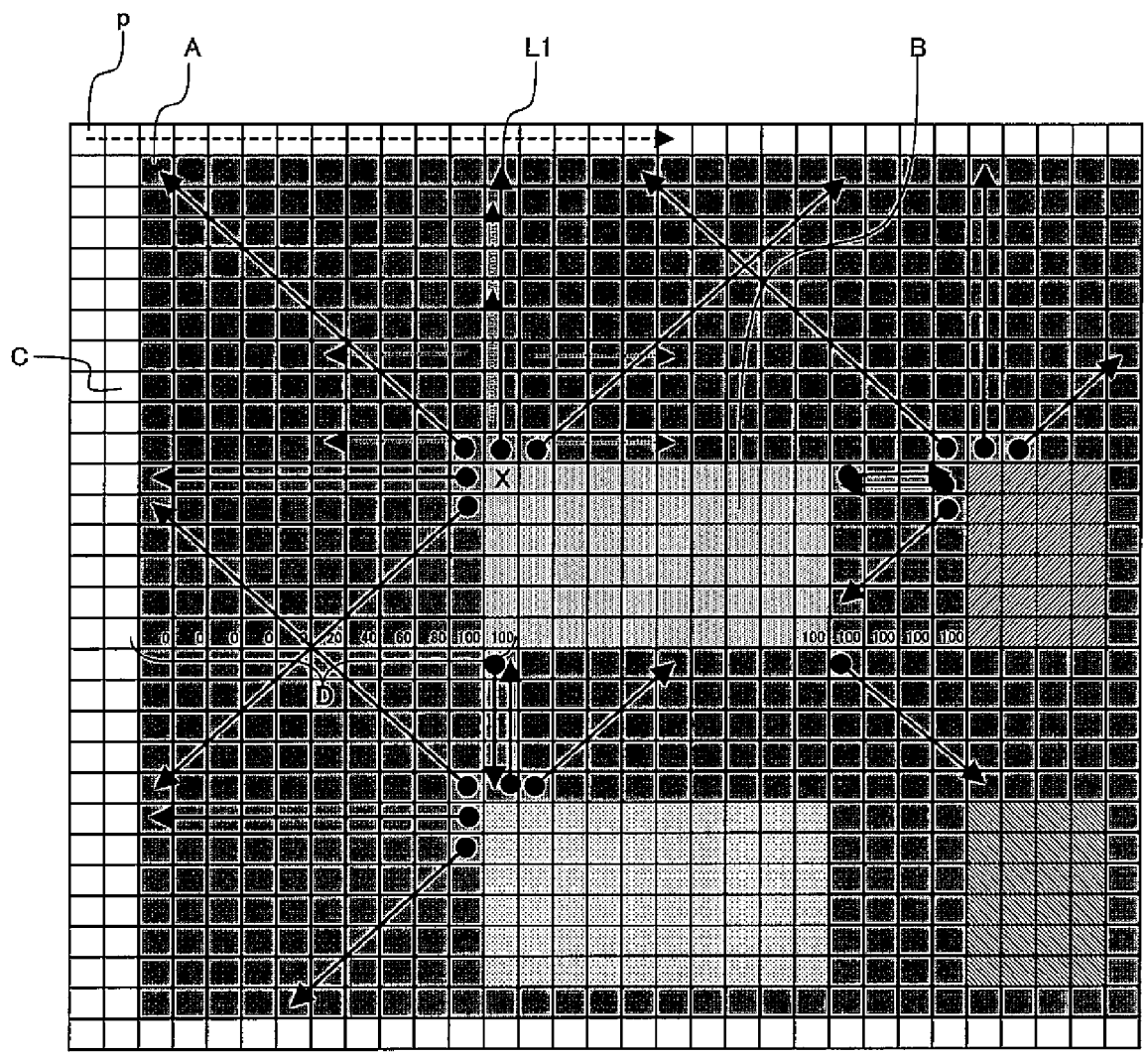
FIG. 4 shows an example of bitmap data for explaining the correction object detection and correction processing.
Figure 5:
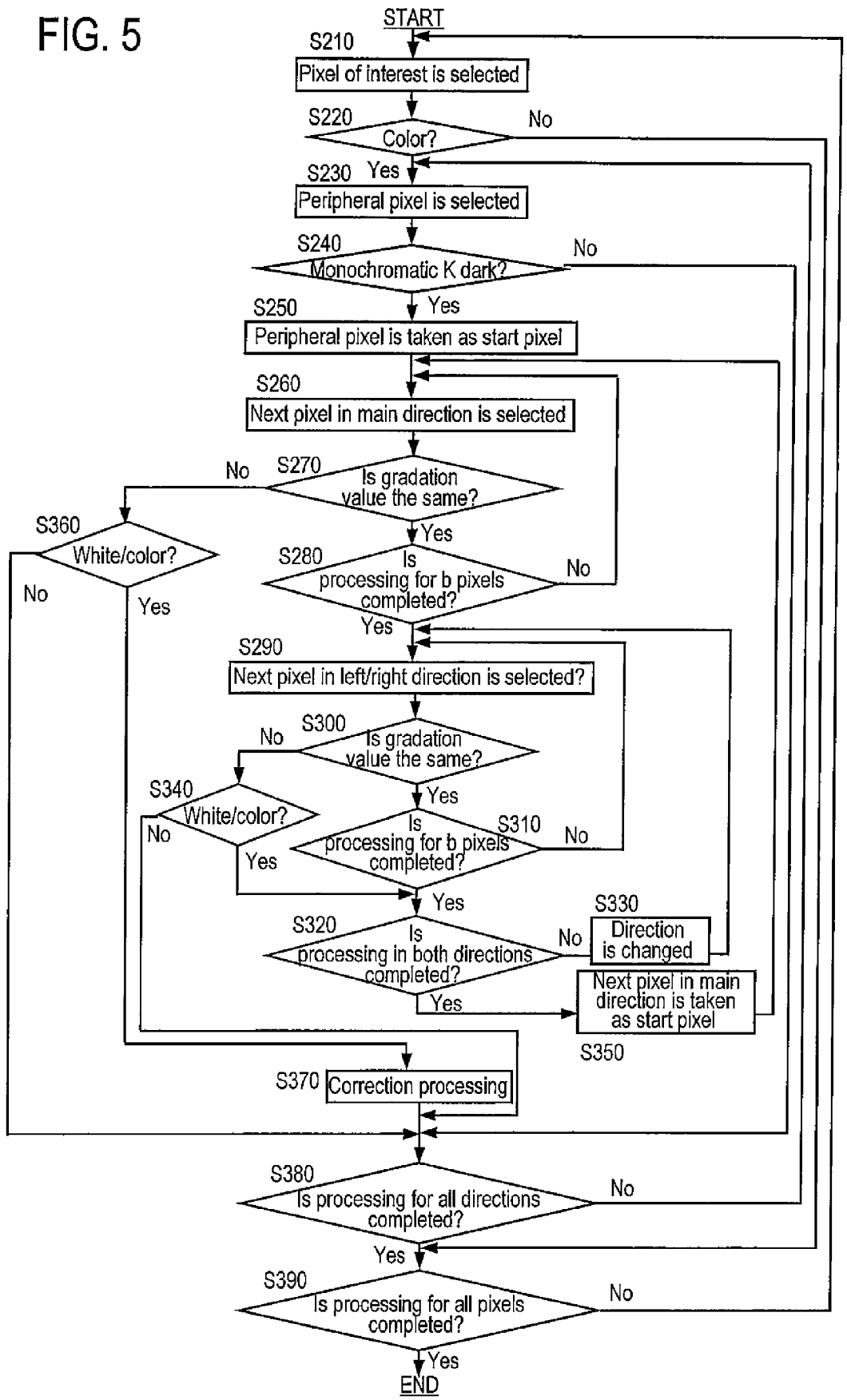
FIG. 5 is a flowchart illustrating an example of the correction object detection and correction processing.

The above-described procedure represents the entire processing performed as a measure against a registration shift. The processing of the above-described step S200, that is, the processing of detecting the correction object region and performing correction will be described below in greater detail. FIG. 4 shows an example of bitmap data for explaining such processing. FIG. 5 is a flowchart illustrating an example of the processing procedure.

First, the CPU 24 selects one pixel of interest (step S210). Here, the selection of pixels is started, for example, from the upper left pixel of bitmap data and performed by repeating a procedure of successively selecting the pixels in this row in rightward direction, making a transition to the lower row once the right end has been reached, and successively selecting the pixels from the left end to the right. In the example shown in FIG. 4, the squares indicated by (p) represent a pixel, and the pixels are successively selected starting from the upper left corner as shown by an arrow.

Then, it is checked whether the selected pixel of interest is "Color" (step S220). Thus, it is determined whether the pixel of interest is classified into the "Color" group in the above-described labeling processing. More specifically, it is checked whether the pixel has a value of 1 by referring to the generated classification planes. When the pixel does not have a value of 1, this pixel is determined not to be "Color" (No in step S220), and processing of the pixel of interest is completed, and if the processing is not completed with respect to all the pixels of the bitmap data that are the object of processing (No in step S390), the next pixel of interest is selected according to the above-described sequence (step S210).

In the example shown in FIG. 4, the pixel represented by white color (C in the figure) are the white pixels classified into the "White" group, the pixels represented by gray color (A in the figure) are dark-gray or black of pixels classified into the "Monochromatic K Dark" group, and pixels represented by points or hatching (B in the figure) are the pixels classified into the "Color" group. In the present example, when the pixel in the upper left corner is a pixel of interest, because this pixel is "White", rather than "Color", the pixel of interest is moved to the adjacent pixel on the right side by the above-described processing. This processing is repeated till the pixel represented by symbol X in the figure is selected as a pixel of interest.

Figure 6:
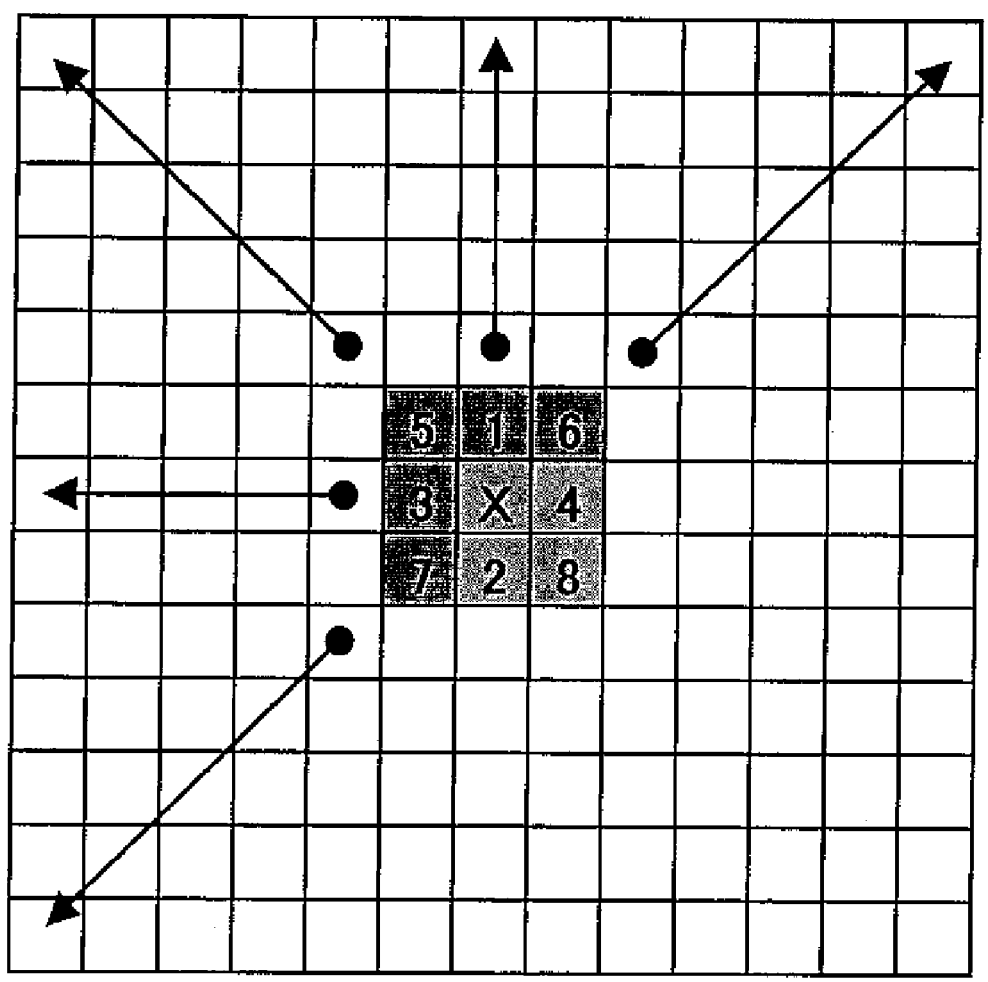
FIG. 6 is illustrates peripheral pixels and detection direction.

Returning to step S220, when it is determined that the classification data of the pixel of interest are 1 and the pixel is "Color" (Yes in step S220), one peripheral pixel of the pixel of interest is selected (step S230). FIG. 6 illustrates peripheral pixels and the detection direction. The symbol X in FIG. 6 represents the pixel of interest, and eight pixels (1 to 8 in the figure) adjacent thereto are peripheral pixels. The numbers of these peripheral pixels represent an example of an order in which they are selected. Therefore, in this example, first, the "1" pixel is selected as a peripheral pixel. An arrow shown in each peripheral pixel indicates the detection direction of the region that has to be corrected. This region is described below and the detection thereof is performed by taking the peripheral pixel as a base point. Therefore, in the printer 2, whether the correction is to be performed is determined with respect to eight peripheral directions of a pixel and the correction processing is performed with respect to the direction for which the correction is necessary.

Then, it is determined whether the selected peripheral pixel is "Monochromatic K Dark" (step S240). The above-described classification planes are also referred to in this processing, and if the value of the peripheral pixel is (a) to 255, the pixel is determined to be "Monochromatic K Dark". If this condition is not met, it is determined that the pixel is not "Monochromatic K Dark".

When the determination result indicates that the pixel is not "Monochromatic K Dark" (No in step S240), the processing of the peripheral pixel is completed, and if the processing is not completed with respect to all the eight peripheral pixels of the pixel of interest, that is, if the processing is not completed with respect to all the eight directions (No in step S380), the next peripheral pixel is selected (S230). In the example shown in FIG. 4 and FIG. 6, the peripheral pixels "2", "4", and "8" are not "Monochromatic K Dark". Therefore, the processing is performed in the above-described manner and the correction processing is not performed with respect to these directions.

On the other hand, when it is determined that the peripheral pixel is "Monochromatic K Dark" (Yes in step S240), it is determined whether a region of K of the same gradation value is present in the detection direction (main direction) of the peripheral pixel. More specifically, the classification data are checked with respect to a preset number "b" of pixels (for example, 5) in the main direction and left-right directions from the peripheral pixel, and when "Monochromatic K Dark" with a gradation value different from that of the peripheral pixel, "Monochromatic K Light", or "Mixed Color K" is not contained in these pixels, the processing successively advances by one pixel at a time in the main direction. If a "Color" or "White" pixel appears in the main direction, it is determined that the space from the peripheral pixel to this pixel in the main direction is a region of K with the same gradation value. Therefore, it is determined that the pixel of interest that is "Color" is adjacent to a region of K with the same gradation number, and the region of K in the main direction is taken as the correction object. On the other hand, if "Monochromatic K Dark" with a gradation value different from that of the peripheral pixel, "Monochromatic K Light", or "Mixed Color K" appears before the appearance of the pixel of "Color" or "white" in the main diction in the course of the above-described processing, then it is determined that a region of K with the same gradation value is not present in this direction, and the processing is shifted to the next peripheral pixel (direction).

Figure 7:
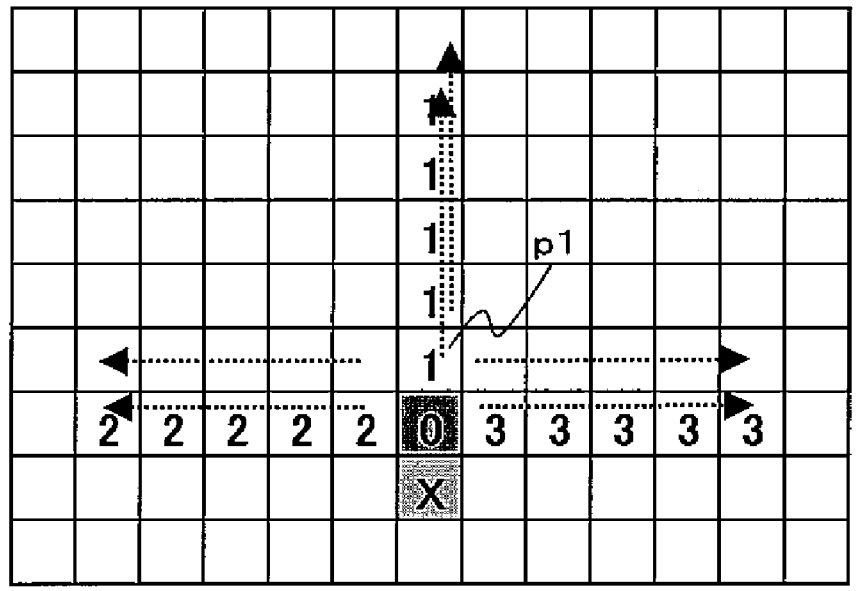
FIG. 7 illustrates the correction object detection processing in the case where the main direction is an upward direction.

More specifically, such detection processing of the correction object that relates to the selected peripheral pixel is realized by steps S250 through S360 shown in FIG. 5. FIG. 7 illustrates the correction object detection processing in the case where the main direction is an upward direction.

First, the selected peripheral pixel is taken as a start pixel (step S250), and it is successively checked based on the classification data whether the gradation value of the next pixel in the main direction is identical to that of the peripheral pixel (steps S260, S270, and No in S280). Then, when the gradation value is the same for "b" pixels (Yes in step S280), the processing is shifted to any direction from among the left and right directions with respect to the main direction, and it is successively checked, from the start pixel in this direction, based on the classification data whether the gradation value of the next pixel is identical to that of the peripheral pixel. (steps S290, S300, and No in S310). When the gradation value is the same for "b" pixels (Yes in step S310), the processing shifts to the remaining direction from among the left and right directions (steps 320 and S330). It is then similarly and successively checked whether the gradation value is the same for "b" pixels. When the results obtained indicate that the gradation value is the same for "b" pixels in this direction, the series of processing operations relating to the start pixel that has been set is completed, the next pixel in the main direction is taken as the start pixel (step S350), and a similar processing is successively performed (to S260).

In the example shown in FIG. 7, first, the peripheral pixel indicated by "0" is taken as a start pixel, and the above-described checking of 5 pixels (pixels "1" in the figure) is performed in the upward direction, which is the main direction. Then, the checking is successively performed with respect to 5 pixels in the left-right direction (pixels "2" in the figure) and 5 pixels in the right-left direction (pixels "3" in the figure). The start pixel is thereafter set as a next higher pixel (p1 in the figure) from among the peripheral pixels and the same processing is successively performed.

When the gradation is not the same (No in step S300) in the same gradation check of the left-right direction (S300), it is checked based on the classification data whether the pixel is either "Color" or "White" (step S340). If the pixel is either "Color" or "White" (Yes in step S340), the processing in this direction is completed, and the processing advances to step S320. On the other hand, when the pixel is neither "Color" nor "White", (No in step S340), the processing of the peripheral pixel is completed and the processing advances to step S380.

Further, when a pixel that does not have the same gradation value appears in the processing in the main direction (No in step S270), it is checked based on the classification data whether the pixel is either "Color" or "White" (Yes in step S360). When the result is such that the pixel is neither "Color" nor "White" (No in step S360), the processing of the peripheral pixel is completed and the processing advances to step S380.

On the hand, when the pixel is either "Color" or "White" (Yes in step S360), a correction range is established, as described hereinabove, with respect to the peripheral pixels (main direction) and the processing advances to step S370.

In the example shown in FIG. 4, for example, where the detection processing of the correction object range is performed with respect to the upward direction of the pixel of interest X (solid arrow L1), the processing in the above-described main direction and left-right directions is performed in the directions of arrows represented by dot lines in the figure, the processing is completed at the upper "White" pixel and the portion indicated by the solid arrow L1 is established as a correction object range.

Then, in step S370, the actual correction processing is executed with respect to the bitmap data. The specific contents of this processing is described below.

Figure 8:
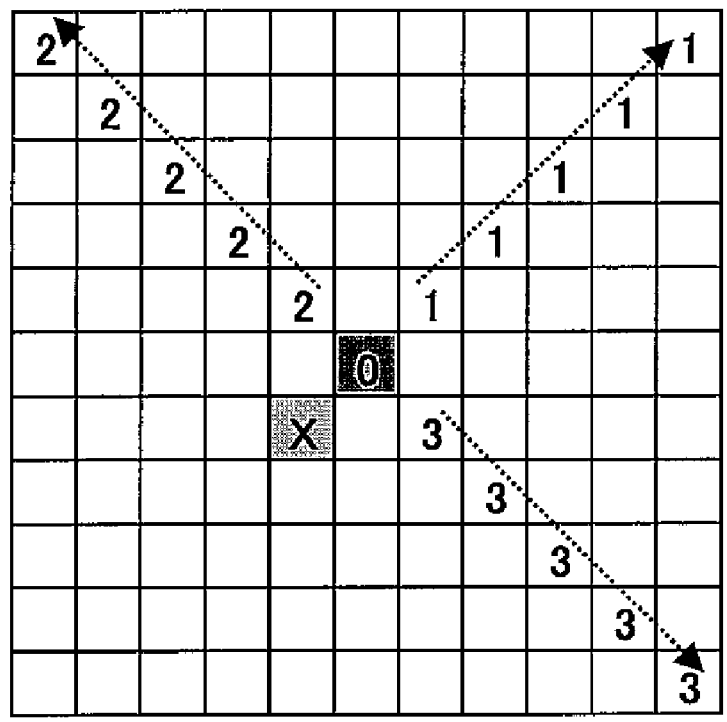
FIG. 8 illustrates the processing relating to the upper-right peripheral pixel.

The processing relating to the above-described one peripheral pixel is executed with respect to all eight above-described peripheral pixels. FIG. 8 illustrates the processing relating to the upper-right peripheral pixel. Similarly to FIG. 7, this FIG. 8 illustrates the correction object detection processing in the main direction (upward direction tilted to the right) relating to the upper-right peripheral pixel. In the case of this direction, the main direction and left-right directions thereof are first checked by taking a peripheral pixel (0 in the figure) as a start pixel and, if necessary, the start pixel is successively moved in the main direction and the same processing is repeated.

If the processing relating to all the peripheral pixels is performed with respect to the pixel X of interest shown in FIG. 4 and FIG. 6, the correction processing is performed with respect to 5 peripheral pixels (1, 3, 5, 6, 7 in FIG. 6) till the "White" region is reached in the direction shown by a solid arrow in FIG. 4.

The processing relating to one pixel of interest is thus completed (Yes in step S380), and if the processing is similarly completed with respect to all the pixels of the bitmap data that are the processing object in the above-described sequence (Yes in step S390), the detection of correction object and correction processing (S200) are completed.

In the above-described detection of correction object and correction processing in the printer 2, the processing is performed by paying attention to the "Color" pixel and taking the dark black region of the same gradation that is adjacent thereto as the correction object. Further, as described hereinabove, in the printer 2, in the processing relating to the peripheral pixels, a predetermined width in the left-right direction with respect to the main direction is checked and if "Monochromatic K Dark" with a gradation value different from that of the peripheral pixels, "Monochromatic K Light", or "Mixed Color K" appears, the correction processing is not performed in the main direction. In this case, it is determined that the "Monochromatic K Dark" pixel that is present in the main direction is part of a region of a photographic image or that with a black gradation, rather than part of the dark black region of the same gradation and, therefore, in the printer 2, the correction processing is not performed with respect to the region of a photographic image or that with a black gradation.

By performing such a processing, in the printer 2, effective correction can be performed with respect to drop-out white caused by registration shift and occurring on the outside of black letters or pictures with a color background, an original color can be maintained for the region of a photographic image or that with a black gradation, and image quality deterioration is prevented.

In the example shown in FIG. 4, the correction processing is performed with respect to a region with a dark gray or black pixels shown by A.

Figure 9:
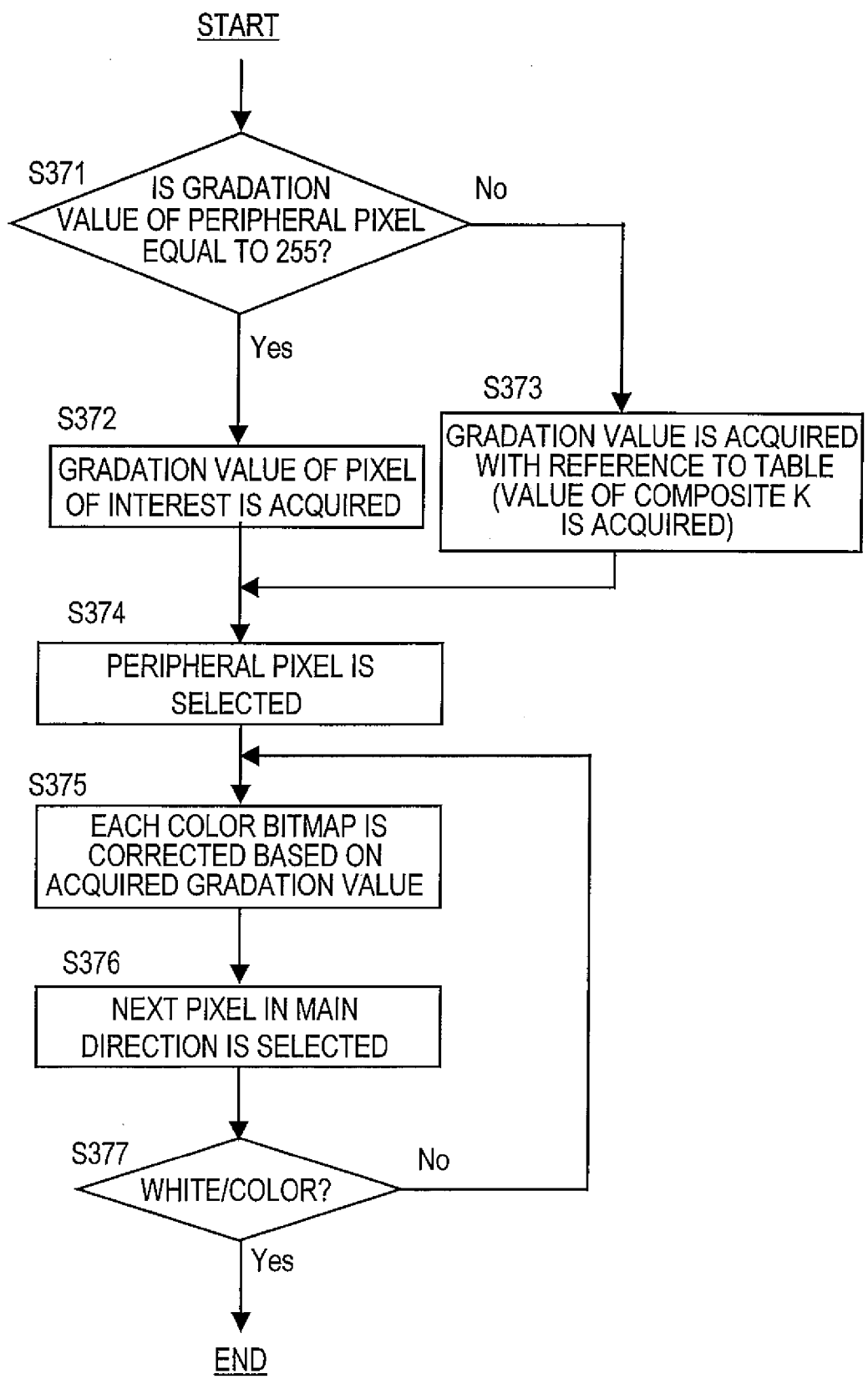
FIG. 9 is a flowchart illustrating the procedure of correction processing of the detected correction zone.

The above-described correction processing (S370) will be described below in greater details. FIG. 9 is a flowchart illustrating the procedure of correction processing of the detected correction location. As described above, if it is determined that the correction processing is executed with respect to one peripheral pixel of a certain pixel of interest (Yes in S360), it is checked whether the gradation value of K of the peripheral pixels is 255 (step S371). Thus, it is determined whether the gradation is true black, which is the highest gradation of K, or dark gray that is equal to or higher than the predetermined value (a). More specifically, this is determined with reference to the classification data of the peripheral pixels.

If the results indicate that the gradation value of K of the peripheral pixel is 255 (Yes in step S371), the gradation value of each color of the pixel of interest ("Color") is acquired from the bitmap (step S372).

On the other hand, if the gradation value of K of the peripheral pixel is not 255 (No in step S371), the gradation value of each color of composite K corresponding to the gradation value of the peripheral pixel is acquired with reference to a correspondence table of composite K that has been prepared in advance (step S373). FIG. 10 shows an example of the correspondence table of composite K. The composite K as referred to herein is the representation of a color of single-color K by mixed colors of CMYK, and the gradation value of each color thereof is determined by the type of the printer in relation to the single-color K value. In the example shown in FIG. 10, for example, when the gradation value of single-color K is 203, the gradation value of each color of the composite K representing this color will be 128 (C), 114 (M), 96 (Y), and 139 (K), respectively. In the above-described processing, the gradation values of each corresponding color are acquired with reference to the table. The correspondence table is stored in the ROM 26 or the like.

If the acquisition of the above-described gradation value is performed (step S372 or S373), first, the peripheral pixels are selected (step S374) and the correction processing based on the acquired gradation values is performed with respect to the pixels (step S375). Thus, the bitmap data of the pixels is modified by the acquired gradation values.

When the gradation value of the pixel of interest is acquired in the aforementioned acquisition processing (S372), a processing of adding the acquired gradation value to the value of bitmap data at this point in time is performed. When the correction processing is performed for the first time with respect to this pixel, the gradation values of colors of the bitmap data are (0, 0, 0, 255) in the CMYK order. Therefore, the cmy value of CMY of the pixel of interest ("Color", K=0) is added and the bitmap data of the pixel are corrected to (c, m, y, 255). For example, where the gradation values of the pixel of interest are (100, 0, 0, 0), the correction is performed to (100, 0, 0, 255). Further, when the correction processing has already been performed with respect to this pixel and CMY have values other than 0, the average value of the value that is already present and the presently added value is taken as the value after correction. For example, when the correction processing of the gradation values (50, 0, 0, 0) of the pixel of interest is performed in a state with (100, 0, 0, 255), the correction is made to values of (75, 0, 0, 255).

When the gradation values of composite K are acquired in the above-described acquisition processing (S373), the bitmap data at this point in time are replaced with the acquired gradation values of composite K. For example, in the case of (0, 0, 0, 203), it is modified to the values of (128, 114, 96, 139) shown in the table in FIG. 10.

Where the correction of the pixel is thus completed, the next pixel is selected in the main direction (step S376), and if this pixel is not "White" or "Color" (No in step S377), the processing returns to step S375 and the above-described correction processing is performed with respect to the selected pixel.

The processing of selecting and correcting the next pixel is repeated till a "White" or "Color" pixel is reached, and if the "White" or "Color" pixel is reached, (Yes in step S377), the correction processing (step S370) is completed. The determination as to whether the pixel is "White" or "Color" is performed based on the above-described classification data.

With the above-described procedure, the processing is performed with respect to one peripheral pixel (one direction of pixel of interest). More specifically, the correction processing is performed with respect to a row of dark gray pixels that have the same gradation value and form a sequence from the "Color" pixel, which is the pixel of interest, in the direction of the peripheral pixel, this row being adjacent to the "White" or "Color" pixels on the opposite side of the pixel of interest, and the bitmap data have any gradation values of CMY with respect to the pixels of this row. In the example shown in FIG. 4, for example, for the upward direction of the pixel X of interest, the correction processing is performed with respect to the pixels of the row shown by a solid arrow L1.

Where the correction processing is performed in the above-described manner, even when the K colorant supply processing shifts in the direction of withdrawing from the pixel of interest due to a registration shift, image data are obtained such that a colorant of a color other than K is supplied into the region adjacent to the pixel of interest. Therefore, the so-called drop-out white is prevented.

Further, in the printer 2, as described above, the correction processing differs depending on the gradation value of K in the correction object region. Thus, where the maximum gradation value (255) is assumed, the color of the pixel of interest is added, and where dark gray equal to or higher than a predetermined gradation value is assumed, the color is replaced with composite K. This is because where the color of the pixel of interest is added to a portion of gray color that is not true black, the color changes visually and there is a possibility of image quality being degraded. This adverse effect can be prevented by using composite K for such a portion.

The above-described adjustment processing (S400) based on the total weight of the colorant will be described below. Where the correction processing of all the bitmap data that are an object of correction by the above-described processing procedure is completed, the CPU 24 checks for each pixel as to whether the sum total of gradation values of colors of the bitmap data at this point in time exceeds a preset total amount for each pixel. For those pixels for which this preset total amount has been exceeded, the bitmap data are corrected so that the sum total of gradation values for the colors is within this total amount. More specifically, each gradation value of CMY is a value obtained by proportionally distributing the remainder obtained by subtracting the gradation value of K from the total amount correspondingly to each gradation value of CMY at this point of time. For example, when the bitmap data at this point of time are (255, 0, 255, 255) and the total amount is 612 (240% where the highest gradation value 255 is taken as 100%), the values of bitmap data are corrected as (178, 0, 178, 255). By performing such processing of total amount adjustment, it is possible to prevent the occurrence of defects caused by the adhesion of excessive total amount of the colorant to the printing medium.

Figure 11:
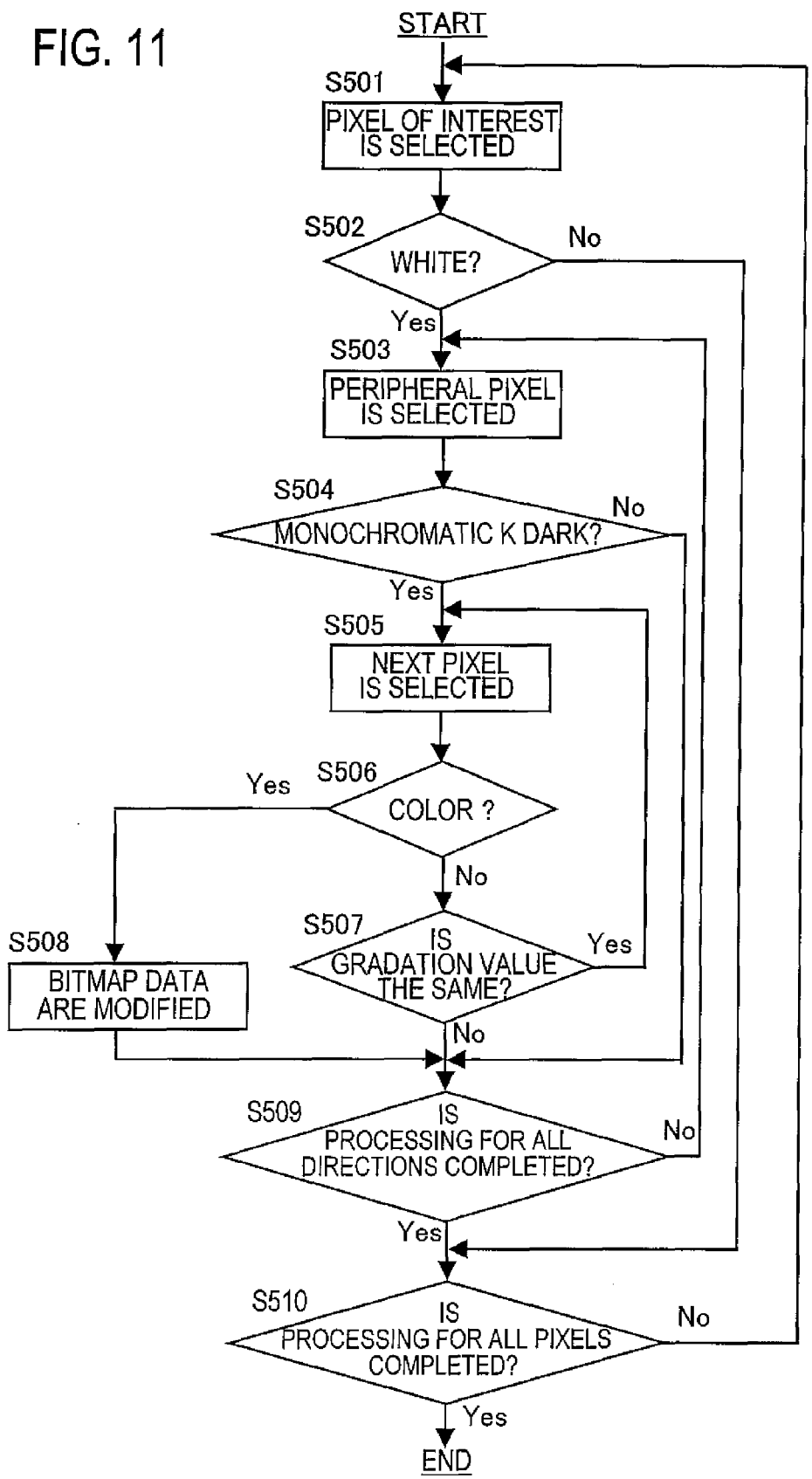
FIG. 11 is a flowchart illustrating an example of the modification processing procedure of a portion adjacent to white.

The specific processing contents of the above-described modification processing performed in relation to the portion adjacent to "White" (S500) will be described below. FIG. 11 is a flowchart illustrating an example of the modification processing procedure.

Where the above-described total amount adjustment processing (S400) is completed, the CPU 24 detects a region that is adjacent to the "White" pixel and in which the above-described correction processing (S370) has been performed and performs the modification processing of bitmap data in relation to the detected region. More specifically, similarly to the detection of a correction zone explained hereinabove with reference to FIG. 5, each pixel is successively selected as a pixel of interest, and in the case of a "white" pixel of interest, it is detected whether the correction has been performed with respect to eight directions surrounding this pixel and the predetermined modification processing is executed with respect to the direction for which the correction has been performed. More specifically, the processing is executed in the following manner.

First, each pixel of bitmap data is successively selected as a pixel of interest similarly to the detection of a correction zone (step S501). Then, it is determined, based on the classification data, whether the pixel is "White" (step S502). Where the pixel is not "White", the next pixel is selected as a pixel of interest (No in S502, No in S510, S501).

On the other hand, where the pixel is "White" (Yes in step S502), one peripheral pixel is selected in the same manner as in the case of detecting a correction zone (step S503), and it is determined, based on the classification data, whether this pixel is "Monochromatic K Dark" (step S504).

Further, when the pixel is not "Monochromatic K Dark" (No in step S504), it is determined whether there is not a correction zone in this direction, the processing moves in the next direction, and a next peripheral pixel is selected (No in S509, S503).

On the other hand, where the pixel is "Monochromatic K Dark" (Yes in step S504), the next pixel in the main direction is selected (step S505), and it is checked, based on the classification data, whether this pixel is "Color" (step S506). Where the pixel is not "Color" (No in step S506), it is checked whether the pixel is "Monochromatic K Dark" of the same gradation value as the peripheral pixel (step S507). Where the pixel is "Monochromatic K Dark" of the same gradation value (Yes in step S507), the processing returns to S505 and the next pixel in the main direction is selected.

The processing thus successively advances in the main direction till the "Color" pixel or a pixel which is not "Monochromatic K Dark" of the same gradation value as the peripheral pixel is reached, and when a pixel which is not "Monochromatic K Dark" of the same gradation value as the peripheral pixel is reached (No in step S507), it is determined that no corrected region is present in this direction and the processing moves to the next direction (No in step S509, S503).

On the other hand, when the "Color" pixel is reached (Yes in step S506), it is determined that the corrected region is present in this direction and the modification processing of bitmap data is performed (step S508). More specifically, a modification processing of returning to the state of bitmap data preceding the correction processing is performed with respect to a pixel on the side of the pixel of interest ("White") from among a pixel row for which the correction processing has been performed within a range from the pixel of interest ("White") to the "Color". Thus, the gradation value of a color other than K is set to 0.

More specifically, when the gradation value of K of the pixel subjected to correction is 255, the added gradation value of the pixel of interest ("Color") is deleted, and when the gradation value of K of the pixel subjected to the correction is not 255, the representation of composite K is returned to the original monochromatic K representation. Further, a range in which the modification processing is performed is taken as a portion obtained by removing a predetermined number of pixels from the side of "Color" pixels in a pixel row for which the correction processing has been performed. The predetermined number is taken as a value of a maximum displacement between the colors that can be caused by a registration shift. Thus, for example, when the maximum displacement of pixel position caused by a registration shift is 5, the predetermined number is 5. When the number of pixels contained in the pixel row does not satisfy this predetermined number, the above-described modification is implemented in relation to one pixel on the "White" side.

Figure 12:
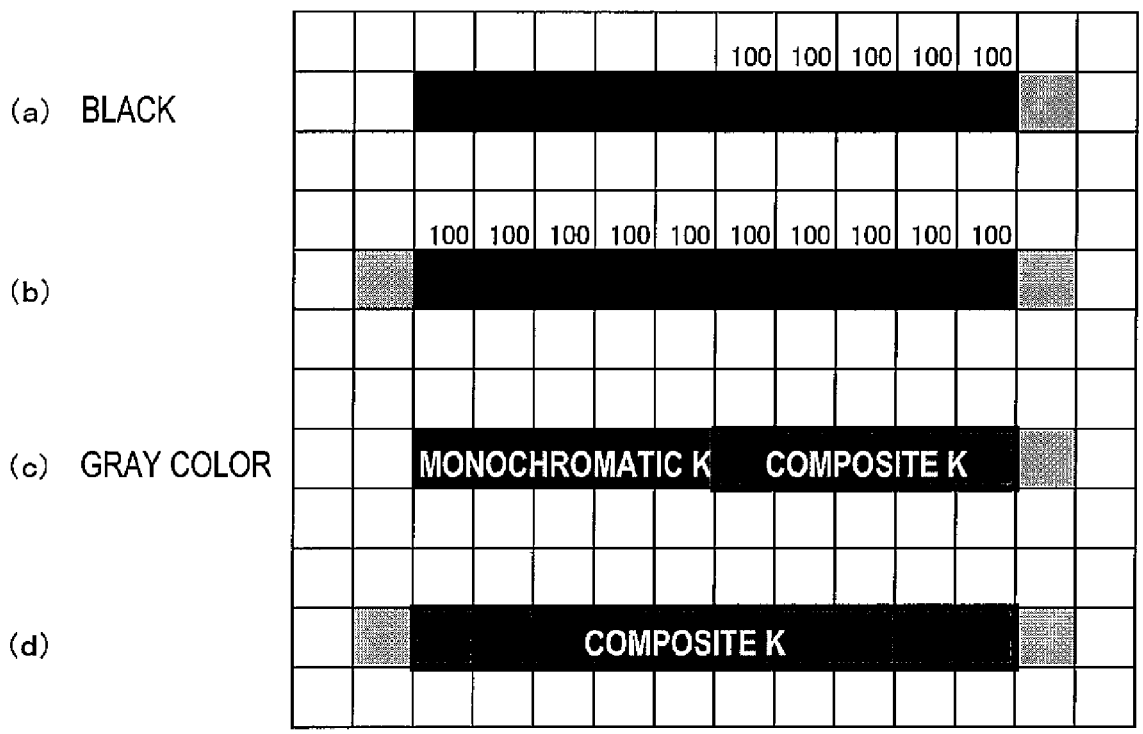
FIG. 12 illustrates the modification processing of a portion adjacent to white.

FIG. 12 illustrates the modification processing. The part of (a) in FIG. 12 illustrates the case in which the correction is performed with respect to a pixel row of "Monochromatic K Dark" with K=255 and then the modification processing is performed due to the contact with "White" pixel at the left end. In the figure, "100" indicates that 100% of the gradation value of the "Color" pixel at the right end is added to the lower pixel. In this case, the above-described predetermined number is 5. Therefore, 5 pixels on the "Color" pixel side are not subjected to the modification processing, the modification processing is performed with respect to 5 pixels on the "White" pixel side, and the addition of "100" is canceled.

In the example shown in the part of (b) in FIG. 12, the pixel row of "Monochromatic K Dark" with K=255 is sandwiched from both sides by "Color" pixels. In this case, because there is no contact with "White" pixels, the modification processing is not performed and the result of correction processing ("100") remains unchanged.

Further, the part of (c) in FIG. 12 illustrates a case in which a pixel row of "Monochromatic K Dark" for which the K=255 condition is not satisfied is subjected to correction and then the modification processing is performed due to the contact with "White" pixel at the left end. Similarly to the case illustrated by the part of (a), a state in which composite K is produced by the correction processing remains for 5 pixels on the right "Color" pixel side, and the original monochromatic K is obtained by the modification processing for 5 pixels on the "White" pixel side.

The example shown in the part of (d) in FIG. 12 illustrates a case in which the pixel row of "Monochromatic K Dark" for which the condition K=255 is not satisfied is sandwiched from both sides by "Color" pixels. In this case, because there is no contact with "White" pixels, the modification processing is not performed and the result of correction processing (composite K) remains unchanged.

In the explanation above, the result of correction processing remains unchanged for a predetermined number of pixels on the "Color" pixel side, but the value of "Color" added by the correction processing may be gradually decreased as the processing advances toward the "White" pixel side. For example, the value can be linearly decreased so that the added amount in the pixel next to the predetermined number of pixels becomes 0. In the example shown by D in FIG. 4, the gradation value of 100% of the "Color" pixels at the right side is added to the pixel at the right end of the pixel row that is the object of correction, the gradation value that is added decreases gradually in the sequence of 80%, 60%, 40%, 20% as the processing advances toward the left side, and a state in which no correction is performed is assumed in the sixth pixel.

Returning to FIG. 11, where the modification processing (S508) is performed in the above-described manner, the processing relating to this direction (peripheral pixel) is completed.

Where the above-described processing is completed with respect to all 8 directions, (Yes in step S509), the processing relating to the pixel of interest is completed. Where the processing is then similarly completed in relation to all the pixels of the bitmap data (Yes in step S510), the modification processing (S500) is completed.

Thus, in the printer 2, the correction processing as a measure against a registration shift, that is, the addition of a color of CMY, is performed in a black or dark gray region adjacent to "Color", but when this region is in contact with "White", the addition of color on the "White" side is canceled. As a result, when the K colorant shifts in the direction of withdrawing of the "White" due to a registration shift, it is possible to prevent a drawback such as the development of CMY colors that are added by the correction processing that is essentially unnecessary. Further, because a region corrected to a necessary degree remains on the "Color" side in this case, no adverse effect is produced on the measure against the registration shift on the "Color" side.

In the above-described embodiment, the correction processing as a measure against a registration shift (processing shown in FIG. 2) is performed by the CPU 24 according to a program, but it may be also executed as a processing based on ASIC, e.g. with the engine I/F 27. Further, in a printing system in which the bitmap data are generated in the host computer 1, the correction processing may be also executed by the printer driver 11. In this case, data after the correction processing are sent to the printer 2 and a similar printing is executed.

As described hereinabove, in the printer 2 of the present embodiment, the correction processing as a measure against a registration shift is executed in pixel units after the bitmap data have been generated. Then, labeling is executed to identify each pixel, a zone that is a correction object is detected using the data identifying the pixels that are obtained by the labeling, and the correction is executed based on the detection results. Therefore, no drop-out appears in the correction object, as in the processing performed in object units, reliable processing can be executed, and the processing can be easily and rapidly performed by the labeling.

A "Monochromatic K Dark" region of the same gradation adjacent to a "Color" region is taken as the correction object, and a color other than K is added to this region. Therefore, even when the position of K shifts in the direction of withdrawing from the "Color" region due to a registration shift, the so called drop-out white can be prevented. Thus, the defects caused by a registration shift that most frequently occur in business use can be effectively prevented.

With the above-described processing, the correction processing is not performed with respect to a region such as a photographic image in which K is mixed with other colors or a region with K gradations. Therefore, no degradation of image quality is caused in this region.

Further, in the above-described detection processing of correction object, it is checked whether the correction is made in relation to all the directions of the object pixel. Therefore, a reliable and complete measure against a registration shift can be taken.

In the above-described embodiment, the image forming apparatus employing the present invention is a printer, but the present invention can be also applied to a copier and the like.

The protection range of the present invention is not limited to the above-described embodiment and covers the inventions set forth in the appended claims and equivalents thereof.

What is claimed is:

1. An image forming apparatus using a plurality of colorants for image formation, comprising
   a generation unit which generates bitmap data, in which each pixel has a gradation value of each color of the colorants, with respect to an object of the image formation;
   a classification unit which classifies the pixels into a plurality of predetermined groups based on the bitmap data and generates classification data corresponding to the classified groups for each pixel;
   a detection unit which detects, based on the classification data, a range, in which a correction processing of modifying the gradation values has to be executed, on the bitmap data; and
   a correction unit which executes the correction processing to the detected range, wherein the image formation is executed based on bitmap data after the correction processing.

2. The image forming apparatus according to claim 1, wherein
   the plurality of groups include at least a group of dark gray for which the gradation value of black color is equal to or higher than a predetermined value and gradation values of colors other than black are 0, and a group of colors for which the gradation values of a color other than black is not 0 and the gradation value of black color is 0.

3. The image forming apparatus according to claim 2, wherein the plurality of groups include a group of white for which the gradation values of all colors are 0.

4. The image forming apparatus according to claim 2 or 3, wherein a region of the dark gray, for which the gradation values are the same, and which is adjacent to a region of the color in an image formation target is detected as a range in which the correction processing has to be executed.

5. The image forming apparatus according to claim 4, wherein
   the detection of the range in which the correction processing has to be executed is performed by checking, with respect to each pixel classified into the group of color, whether the region of the dark gray for which the gradation values are the same continues in all directions around the pixel, based on the classification data.

6. The image forming apparatus according to claim 4, wherein
   a region in which black color and a color other than black are mixed and a region in which the gradation value of black color varies in the image formation object are not detected as ranges in which the correction processing has to be executed.

7. An image forming method in an image forming apparatus using a plurality of colorants for image formation,
   the method comprising:
   generating bitmap data, in which each pixel has a gradation value of each color of the colorants, with respect to an object of the image formation;
   classifying the pixels to a plurality of predetermined groups, based on the bitmap data and generating classification data corresponding to the classified groups for each pixel;
   detecting, based on the classification data, a range, in which a correction processing of modifying the gradation values has to be executed, on the bitmap; and
   executing the correction processing to the detected range, wherein
   the image formation is executed based on bitmap data after the correction processing.

8. A non-transitory computer readable medium recording a printing data generation program that causes a host device of an image forming apparatus to execute a processing of generating printing data for an image forming apparatus using a plurality of colorants for image formation, the program causing the host device to execute:
   generating bitmap data in which each pixel has a gradation value of each color of the colorants with respect to an object of the image formation;
   classifying the pixels into a plurality of predetermined groups based on the bitmap data and generating classification data corresponding to the classification groups for each pixel;
   detecting, based on the classification data, a range, in which a correction processing of modifying the gradation values has to be executed, on the bitmap; and
   executing the correction processing to the detected range, wherein
   the image formation is executed based on bitmap data after the correction processing.

* * * * *